United States Patent
Lindemann

(10) Patent No.: US 9,663,302 B2
(45) Date of Patent: May 30, 2017

(54) CONVEYING ROLLER HAVING A HEAD ELEMENT

(71) Applicant: INTERROLL HOLDING AG, S. Antonino (CH)

(72) Inventor: Harry Lindemann, Wermelskirchen (DE)

(73) Assignee: INTERROLL HOLDING AG, San Antonio (CH)

( * ) Notice: Subject to any disclaimer, the term of this patent is extended or adjusted under 35 U.S.C. 154(b) by 0 days.

(21) Appl. No.: 14/425,109

(22) PCT Filed: Sep. 10, 2013

(86) PCT No.: PCT/EP2013/068686
§ 371 (c)(1),
(2) Date: Mar. 2, 2015

(87) PCT Pub. No.: WO2014/044573
PCT Pub. Date: Mar. 27, 2014

(65) Prior Publication Data
US 2015/0210480 A1     Jul. 30, 2015

(30) Foreign Application Priority Data
Sep. 18, 2012 (DE) .................... 20 2012 008 919 U

(51) Int. Cl.
*B65G 39/02* (2006.01)
*B65G 39/09* (2006.01)
*B65G 13/02* (2006.01)

(52) U.S. Cl.
CPC ............. *B65G 39/02* (2013.01); *B65G 39/09* (2013.01); *Y10T 29/49549* (2015.01)

(58) Field of Classification Search
None
See application file for complete search history.

(56) References Cited

U.S. PATENT DOCUMENTS 3,815,196 A * 6/1974 Gotham ................ B65G 39/09
                                               193/37
3,994,380 A    11/1976 Hope et al.
(Continued)

FOREIGN PATENT DOCUMENTS

DE       1779772 U    12/1958
DE       1247941 B     8/1967
(Continued)

OTHER PUBLICATIONS

International Preliminary Report on Patentability mailed Apr. 2, 2015, from PCT Application No. PCT/EP2013/068686 (12 pages).

(Continued)

*Primary Examiner* — Kavel Singh
(74) *Attorney, Agent, or Firm* — Kilpatrick Townsend & Stockton LLP

(57) ABSTRACT

The invention relates to a conveyor roller for conveyor systems for the purpose of conveying containers, pallets and the like, comprising a roller body with a roller axis, the outer peripheral area of which represents a bearing surface for material to be conveyed, and a head element that is inserted with an insertion section into a hollow end of the roller body. The invention further relates to a method for manufacturing such a conveyor roller. In the case of the conveyor roller according to the invention, a holding element is arranged at the insertion section, which holding element has at least one point on the outer circumference thereof, the distance of which in a radial direction from the roller axis is greater than a distance between the roller axis and a point on an inner circumference of the hollow end of the roller body in the same radial direction.

14 Claims, 9 Drawing Sheets

(56) References Cited

U.S. PATENT DOCUMENTS

Figure 1:
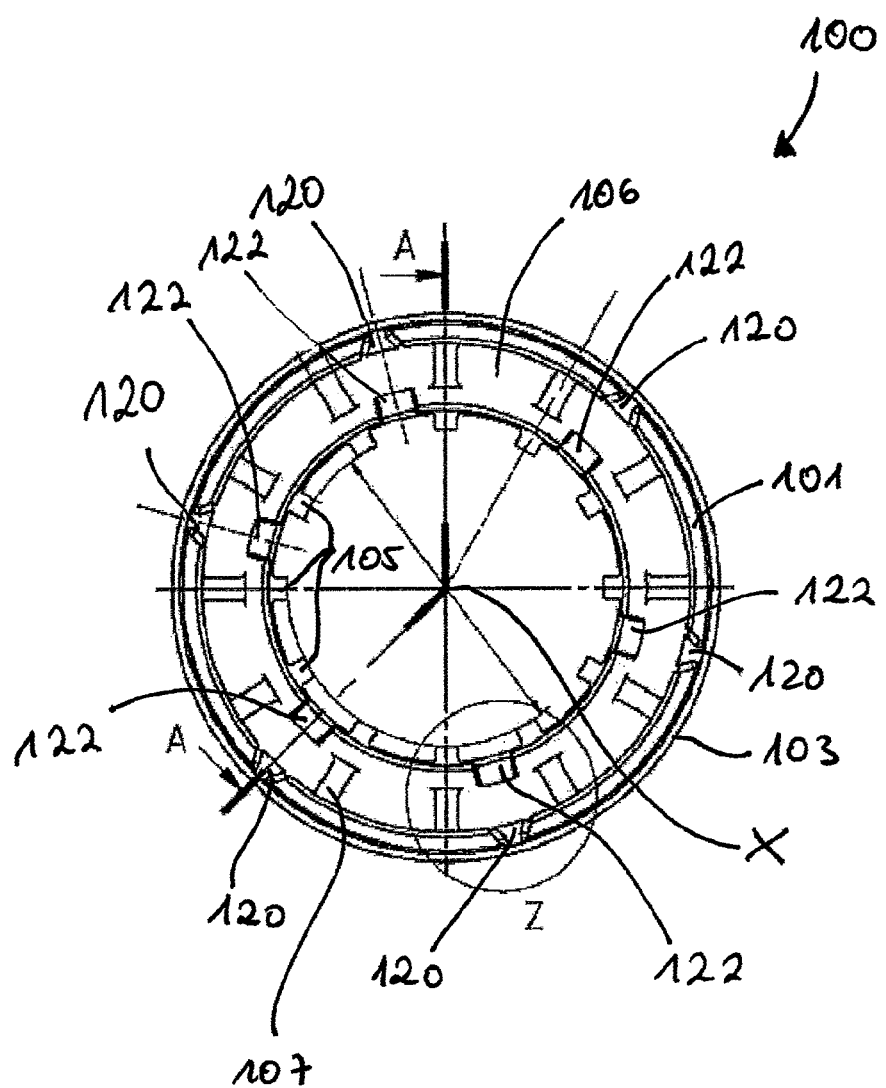

| | | | |
|---|---|---|---|
| 6,257,385 B1 * | 7/2001 | Ouchi | F16D 41/067 |
| | | | 192/110 B |
| 6,782,996 B1 * | 8/2004 | Wolf | B65G 39/09 |
| | | | 193/37 |
| 2003/0162641 A1 | 8/2003 | Reynolds | |
| 2009/0188777 A1 | 7/2009 | Hong | |
| 2011/0062000 A1 | 3/2011 | Yamamoto | |

FOREIGN PATENT DOCUMENTS

| | | |
|---|---|---|
| DE | 3211952 A1 | 11/1982 |
| DE | 3842905 C1 | 6/1990 |
| JP | S49-091986 U | 8/1974 |
| JP | H04-044218 U | 4/1992 |
| JP | 003049933 U | 6/1998 |
| JP | 2001-130732 A | 5/2001 |
| WO | 2005/019070 A1 | 3/2005 |

OTHER PUBLICATIONS

International Search Report and Written Opinion mailed Nov. 6, 2013, from PCT Application No. PCT/EP2013/068686 (10 pages).
Examination Report dated Feb. 23, 2016 for related Japanese Application No. 2015528429, including English translation, 7 pages.

* cited by examiner

CONVEYING ROLLER HAVING A HEAD ELEMENT

This application is a U.S. National Phase of International Application No. PCT/EP2013/068686, filed Sep. 10, 2013, which claims priority to German Patent Application No. 202012008919.6, filed Sep. 18, 2012, the disclosures of which are incorporated by reference herein.

The invention relates to a conveyor roller for conveyor systems for the purpose of conveying containers, pallets and the like, comprising a roller body with a roller axis, the outer peripheral area of which represents a bearing surface for material to be conveyed, and a head element that is inserted with an insertion section into a hollow end of the roller body.

The invention further relates to a method for manufacturing such a conveyor roller.

Conveyor rollers of this design are used for various purposes in logistical applications. Thus for example, they can be used in pallet conveying, for the conveyance of packages in parcel distribution centers, for the conveyance of containers in warehouses of various kinds or for baggage transportation in airports, as well as numerous other applications. Usually, a conveyor track is constructed which consists of several rollers arranged next to one another, the upper peripheral area of which serves as a mount for the material to be conveyed. In these conveyor tracks, idle rollers which do not have a drive are arranged on one side and are simply rotatably mounted in a conveyor cage. Furthermore, powered conveyor rollers are arranged in these conveyor tracks, said rollers being driven by motor and put into rotation by an electric drive unit. The motor-driven conveyor rollers serve on the one hand to transport the material to be conveyed directly over the outer peripheral area of their roller bodies. On the other hand, through the transmission of the rotation of the motor-driven conveyor roller to one or more idle rollers by means of a transmission element, such as a belt drive, one or more idle rollers can be put into rotation by the motor-driven conveyor roller, in order to also propel the material to be conveyed over their outer peripheral area.

Conveyor rollers are preferably constructed in such a manner that the roller body is designed as hollow, at least in sections, and in particular has a hollow end, preferably two hollow ends. For motor-driven conveyor rollers, the drive unit is preferably arranged inside the interior of the roller body. If the drive unit is arranged inside the roller body, no mechanical components arranged outside the roller body are necessary in order to generate the rotation of the rollers. A drive unit arranged in the interior of the roller body can, for example, have a coupling unit, which is designed and arranged to transmit a torque from the drive unit to an inner peripheral area of the interior of the roller body.

From EP 1 671 901 B1, a conveyor roller is known whereby a head element designed as a bushing is inserted into a hollow end of the roller body and is thereby rigidly connected. The head element designed as a bushing from EP 1 671 901 B1 includes a bearing which is rotatably mounted to a pin of a cage. In this manner, the end of the roller body can be easily rotatably mounted with regard to a cage. So that the head element can be inserted into the hollow end of the roller body, at least in sections, namely its insertion section, the cross-section of the insertion section is preferably adjusted in a plane which is orthogonal to the roller axis of the cross-section of the hollow end of the roller body, which is also in a plane which is orthogonal to the roller axis.

Such existing conveyor rollers are simple to manufacture and install. However, it is desirable to further improve existing conveyor rollers, and to increase their reliability.

It is thus an object of the present invention to provide or manufacture a conveyor roller of the previously mentioned kind which at least partially fulfils one or more of the aforementioned needs.

This object is achieved according to the invention by a conveyor roller of the aforementioned type, in which a holding element is arranged at the insertion section, which holding element has at least one point on the outer circumference thereof, the distance of which in the radial direction from the roller axis is greater than a distance between the roller axis and a point on an inner circumference of the hollow end of the roller body in the same radial direction.

The invention is based on the recognition that the transmission of the rotation from one roller to another, in particular from a motor-driven conveyor roller to one or a plurality of idle rollers, can be substantially improved by providing a holding element at the insertion section, which can be inserted therewith into the hollow end of the roller body. Thus, on the one hand, the reliability of conveyor rollers, as well as motor-driven conveyor rollers and of idle rollers, can be improved, and in addition, the precision of the conveying of transported material, in particular with respect to starting and stopping, can be increased.

A radial direction is to be understood to be a direction that is orthogonal to the roller axis. Thus in a specific radial direction that is orthogonal to the roller axis or in a radial direction with reference to the roller axis, the holding element is at a distance from the roller axis that is greater than the distance between a point on the inner circumference of the hollow end of the roller body in the same radial direction, i.e. the holding element extends further from the roller axis on a specific radial direction than the inner circumference of the hollow end of the roller body.

In the case of a stationary conveyor roller in the installation position for example, the specific radial direction may be a direction that is oriented vertically upward from the roller axis. According to the invention, in this direction that is oriented vertically upward from the roller axis, a point on the outer circumference of the holding element is located further from the roller axis than a point on the inner circumference of the hollow end of the roller body. This can mean, for example, that a circle, which circumscribes a cross-section that is orthogonal to the roller axis of the holding element, is greater than the inner cross-section of the hollow end of a hollow-cylindrical roller body.

In one specific radial direction, the holding element may preferably have a diameter that is greater than the inside diameter of the hollow end of the roller body in the same radial direction.

Thus, according to the invention, when inserting the insertion section of the head element with the holding element into the hollow end of the roller body, it is necessary to make an adjustment between the holding element and the end of the roller body, for example in that the part of the holding element having the greater circumference digs into the inner wall of the hollow end of the roller body. In this way, a significantly improved connection between the head element and the roller body is created, which prevents a relative rotational movement of the head element relative to the roller body from occurring.

It is preferred that the head element have an inner cavity, which in particular is designed to receive bearing elements by means of which the conveyor roller can be mounted to a cage. In particular, the inner cavity is designed to receive a roller bearing for the mounting of the bearing pin. The bearing pin can, for example, be formed by a sleeve provided with an inner thread which is mounted to the inner ring of the roller bearing, and a screw that can be screwed into this inner thread.

The conveyor roller according to the invention can be designed as an idle roller or as a motor-driven conveyor roller. In an embodiment as a motor-driven conveyor roller, the conveyor roller is characterized by a drive unit, which is designed and arranged to transmit a torque to the roller body.

It is particularly preferred that the insertion section and the end of the roller body respectively have a cylindrical cross-section. Cross-section, here, is understood to be a section in a plane which is orthogonal to the roller axis. In particular when the insertion section of the head element has a circular cross-section and the hollow end of the roller body also has a circular cross-section, the arrangement of an above-described holding element is especially preferred, since there is no positive locking between the cylindrical outer surface of the insertion section and the cylindrical inner surface of the hollow end of the roller body but rather, only a frictional connection. The holding element advantageously prevents the head element from sliding through or from exhibiting play with respect to the roller body, even when the frictional connection between the cylindrical outer surface of the insertion section and the cylindrical inner surface of the hollow end of the roller body is diminished or fails.

It is furthermore especially preferred that the head element have a transmission section for transmitting a torque to a transmission element.

The advantages of the invention become particularly useful if the rotation of the roller body is to be transmitted via the head element to one or more other rollers. In this regard, the head element preferably has a transmission section which is not inserted into the roller body, but rather extends outward beyond the roller body in an axial direction. A belt drive can be arranged, (at this transmission section, for example), which, for example, connects a motor-driven conveyor roller with directly or indirectly neighboring idle rollers in the conveying and/or opposite direction.

It is particularly preferred that the transmission section in its outer circumference have at least a W-shaped circumferential profile, around which a poly-V-belt may be placed. Especially preferred is the design of a circumferential profile having a double-W-shape, in order to be able to receive two poly-V-belts, or the design of a multiple-V-circumferential profile, in order to be able to receive one or a plurality of poly-V-belts.

Such poly-V-belts can be obtained, for example, from the company Hutchinson. Instead of a W-profile, a multiple-V profile can also be constructed at the outer circumference of the transmission section in order to be able to receive poly-V-belts with more than two V-shaped inner wedges. The poly-V-belts have an enlarged contact surface in comparison to conventional belts. This allows for the transmission of greater torques. The transmission of greater torques, however, hastens the failure of the frictional connection between the head element and the roller body. In order to reliably realize a greater transmission of torque, it is thus necessary to ensure a torque-resistant connection between the head element and the hollow end of the conveyor roller for correspondingly high torques, which is achieved by providing the holding element In a preferred embodiment, the holding element has a disk-shaped design. A disk-shaped design is understood to be the shape of the holding element, which has a substantially smaller circumference in the direction of the roller axis, i.e. axially, than it does orthogonally to the roller axis, i.e. in a radial direction.

In addition, it is preferred that the holding element has a star-shaped design. A star-shaped design of the holding element is, in particular, understood to be a design in which the holding element has peaks that are oriented radially outward in a cross-section orthogonal to the roller axis. The peaks are preferably uniformly distributed around the circumference of the holding element.

The peaks may be arranged such that they are radially opposite one another or may be displaced relative to one another. In the case in which the peaks are arranged such that they are radially opposite one another, the diameter of the holding element in the region of the peaks is greater than an inner diameter of the hollow end of the roller body. In the case in which the peaks are arranged such that they are offset from one another, the radius of the holding element in the region of the peaks, and thus the distance of an outer circumference to the roller axis, is greater than the radius of a hollow end of the roller body, thus a distance between the roller axis and a point on the inner circumference of the hollow end of the roller body.

Preferably arranged between the peaks are flattened sections, which are at a lesser radial distance from the roller axis than the peaks. The transition between the flattened sections and the respective, adjacent peaks can preferably be provided having concave curvatures. The holding element can be designed having a continuous surface or having an inner, preferably circular, recess. Such a configuration of the holding element has the advantage that, on the one hand, a plurality of peaks are provided in order to create the torsionally rigid connection between the head element and the roller body, wherein at the same time, material, and thus weight and cost, can be saved on the holding element.

It is particularly preferred that the holding element comprises or consists of a first material, and the roller body comprises or consists of a second material, and the first material is harder than the second material.

If the holding element, in particular those parts of the holding element that form the circumferential peaks, is harder than the roller body, the holding element or the circumferential peaks thereof dig into the inner surface of the roller body when the insertion section of the head element is inserted into the hollow end of the roller body. This creates an especially reliable torsionally rigid connection between the head element and the roller body, which prevents relative movements between the head element and the roller body. Especially preferred is that the holding element be formed out of metal.

The head element and the holding element may be integrated and made out of the same material. It is especially preferred, however, that the head element comprises or consists a third material, and that the first material be harder than the third material. The head element thus consists of a different material than the holding element or at least comprises another material. It is thereby possible to form the head element out of a softer and/or more cost-effective material than the holding element, for example in order to save weight and/or costs as compared to an embodiment of the head element made out of the same material as the holding element.

The head element is preferably manufactured in plastic, in particular a stiff plastic such as polyamide or a comparable plastic. The head element is preferably not filled or strengthened with fillers such as fibers, particles or the like, in order to achieve favorable wear behavior from the attachment to the drive belt running thereon. By contrast, the holding element can be formed out of a material that is harder than the head element and in particular, the holding element can be manufactured out of a metallic material such as steel, in particular a spring steel.

In a preferred embodiment, slots are distributed around the circumference of the insertion section and the holding element has circumferential peaks, which extend radially through the slots towards the outside. The slots are preferably uniformly distributed along the circumference and in addition, preferably extend parallel to the roller axis. In addition, it is especially preferred that the slots extend from one end of the insertion section in the direction of the transmission section and end in the insertion section.

This embodiment has the advantage that it is possible to slide the holding element easily from the end of the insertion section onto the head element, that the circumferential peaks are oriented towards the slots and the holding element is arranged on the insertion section, since it can only be inserted into the head element as far as the slots extend. The end of the slots thus represents a stopper for the holding element, which proves to be advantageous in particular when inserting the insertion section into the end of the roller body.

In so doing, it is especially preferred that the slots taper towards the transmission section. In this way, the slots are wider at the end of the insertion section so that the insertion of the circumferential peaks of the holding element into the slots is made easier, and the slots taper at their ends to such a degree that a rotation of the holding element relative to the head element about the roller axis is prevented.

In a further preferred embodiment, the insertion section tapers at the end that is oriented towards the transmission section. In so doing, it is especially preferred that the end of the roller body has a flange in the region of the tapered end of the insertion section.

In this embodiment, the torsionally rigid connection between the head element and the roller body is further improved in that the outer end of the roller body is flanged around the tapered portion of the insertion section after the insertion section has been inserted into the end of the roller body.

Pursuant to a further aspect of the invention, the above-mentioned object is achieved by a method of manufacturing a conveyor roller for conveyor systems for conveying containers, palettes and the like, in particular an above-described conveyor roller or a further embodiment thereof, comprising the steps:
  Provision of a roller body having a roller axis, the outer peripheral area of which represents a bearing surface for material to be conveyed,
  Provision of a head element having an insertion section for insertion into the hollow end of the roller body,
  Arrangement of a holding element on the insertion section, wherein the holding element has at least one point on the outer circumference thereof, the distance of which in a radial direction from the roller axis is greater than a distance between the roller axis and a point on an inner circumference of the hollow end of the roller body in the same radial direction.
  Insertion of the insertion section of the head element with holding element into the hollow end of the roller body.

In regard to the advantages, versions of embodiments and embodiment details of this method according to the invention and their further embodiments, reference is made in the meantime to the above description in regard to the corresponding features of the conveyor.

Figure 2:
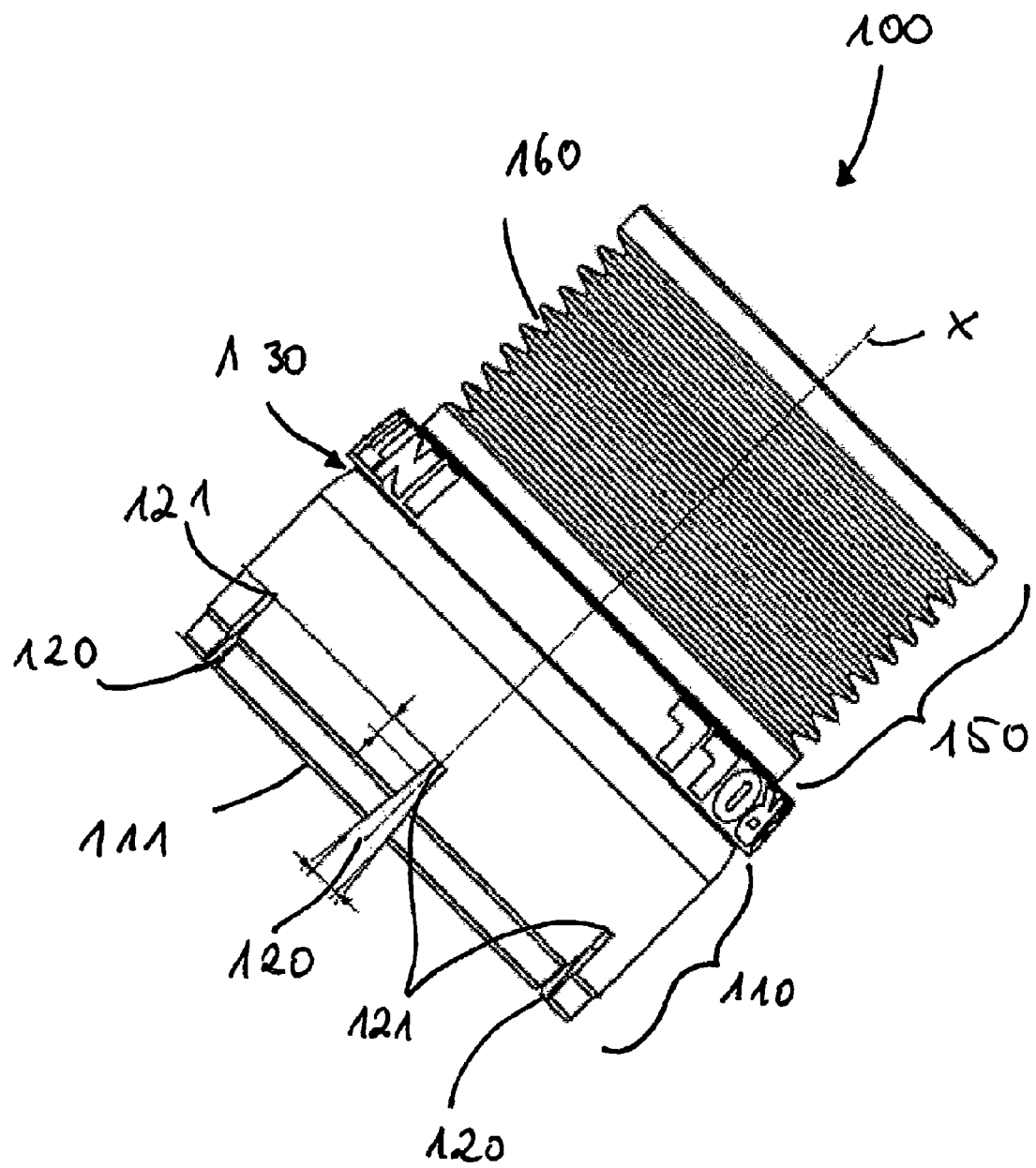
Figure 3:
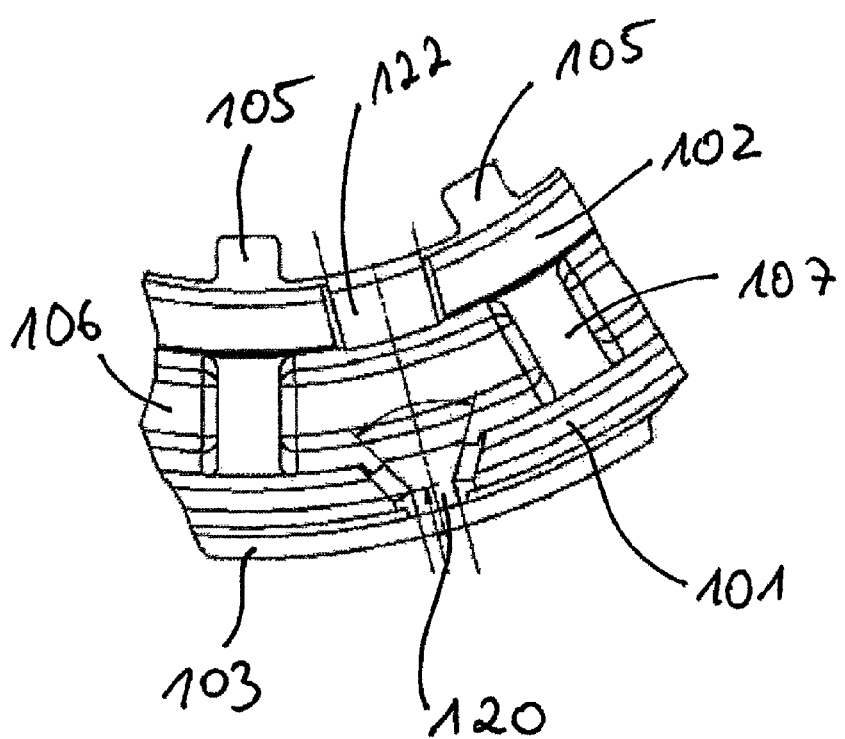
Figure 4:
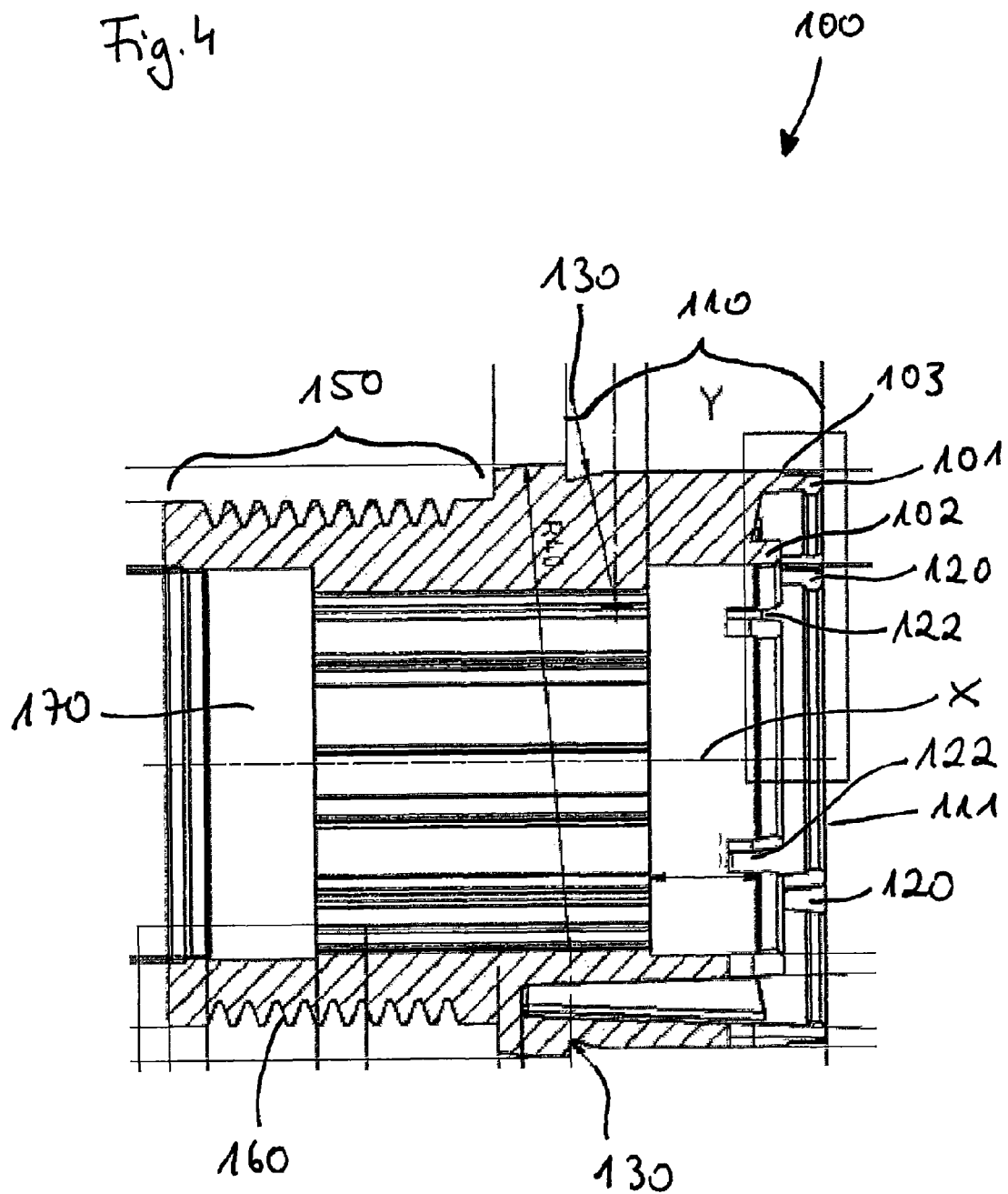
Figure 5:
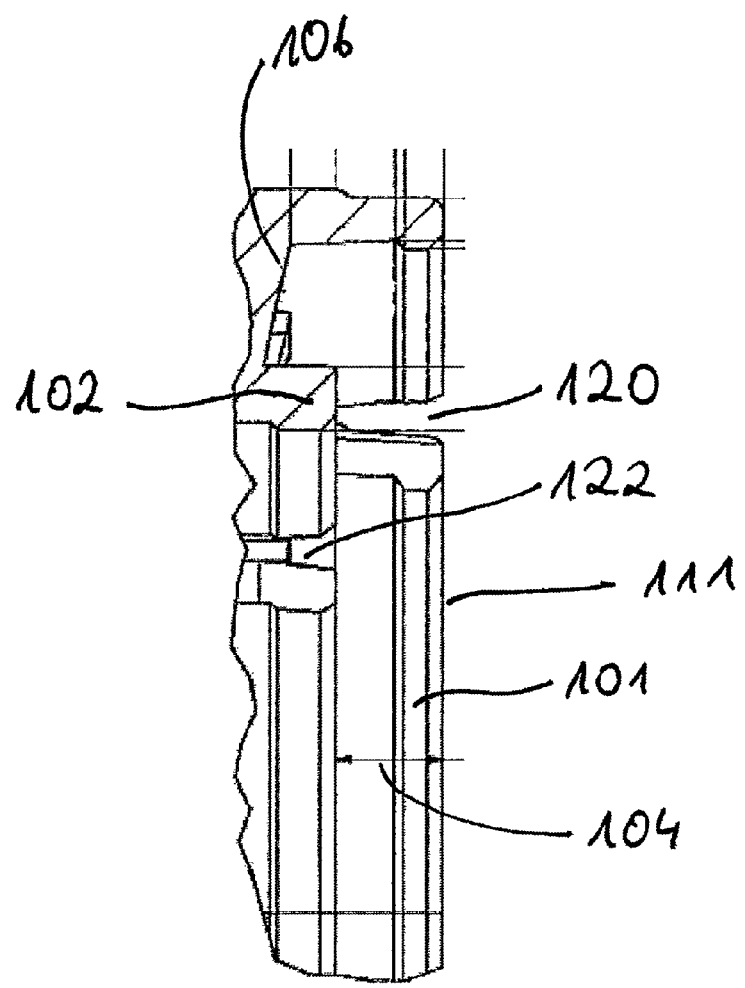
Figure 6:
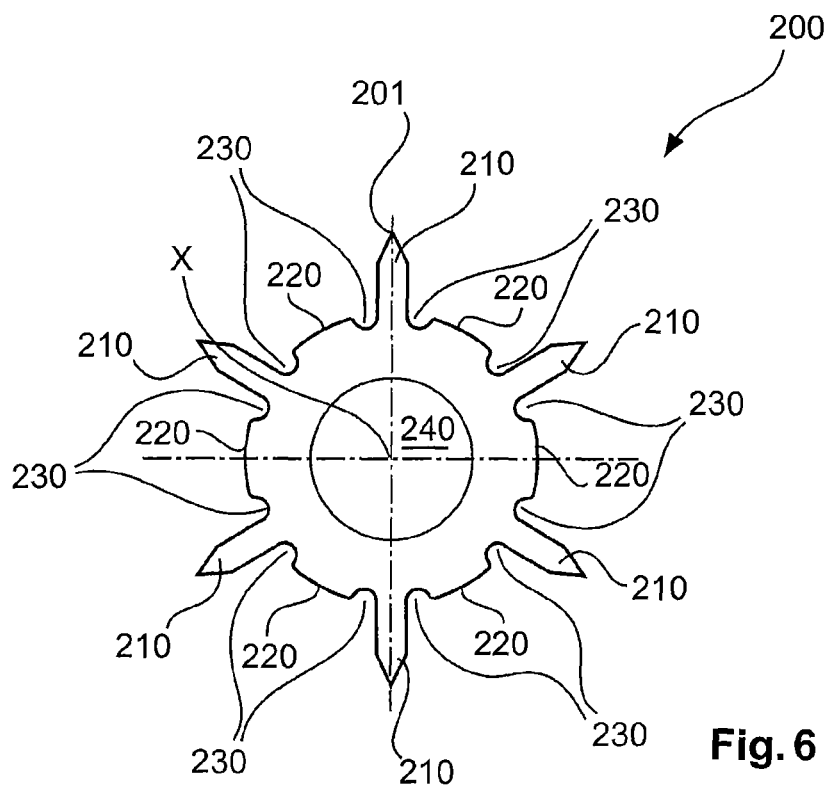
Figure 7:
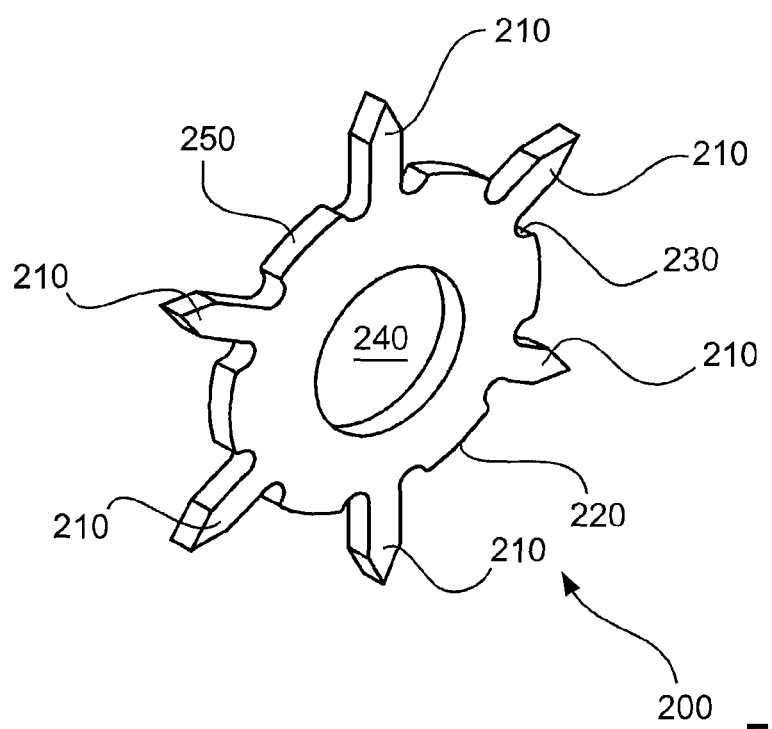
Figure 8:
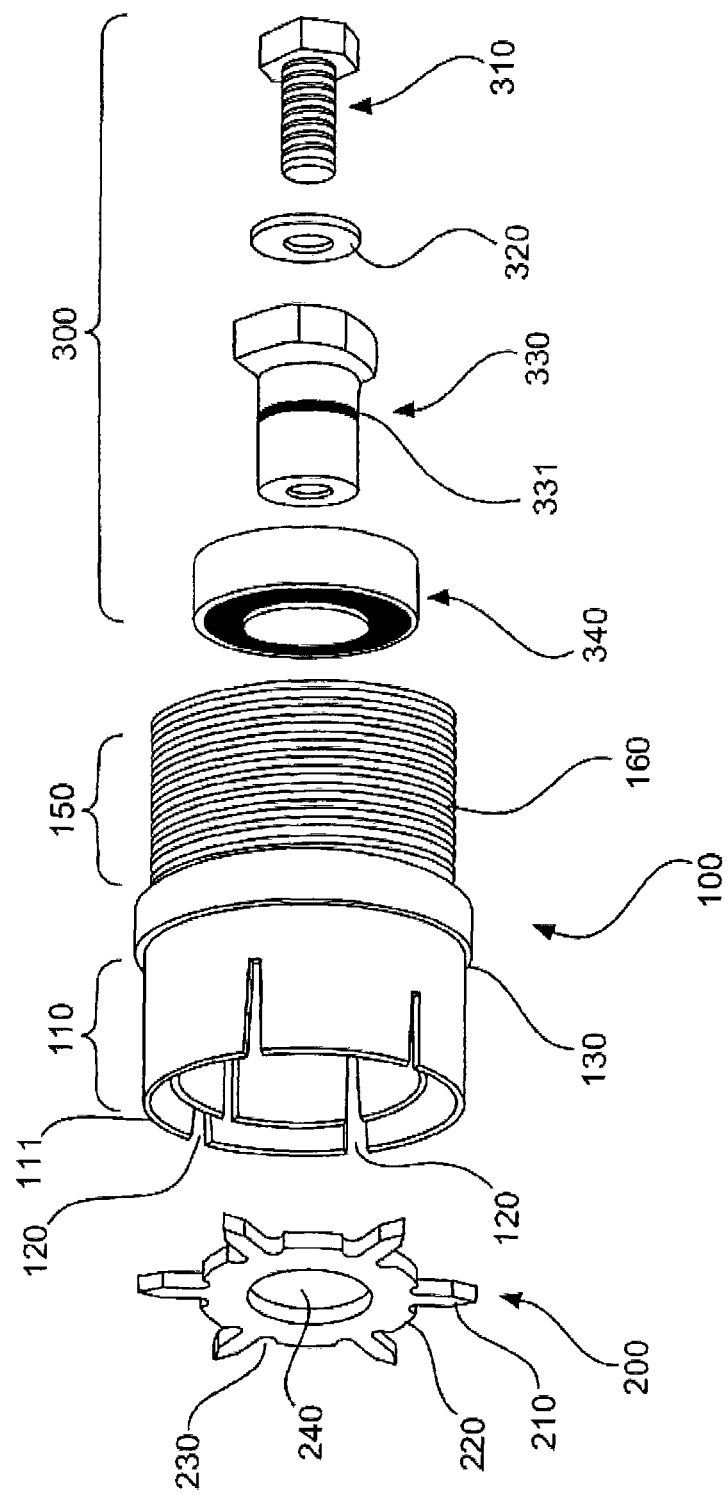
Figure 9:
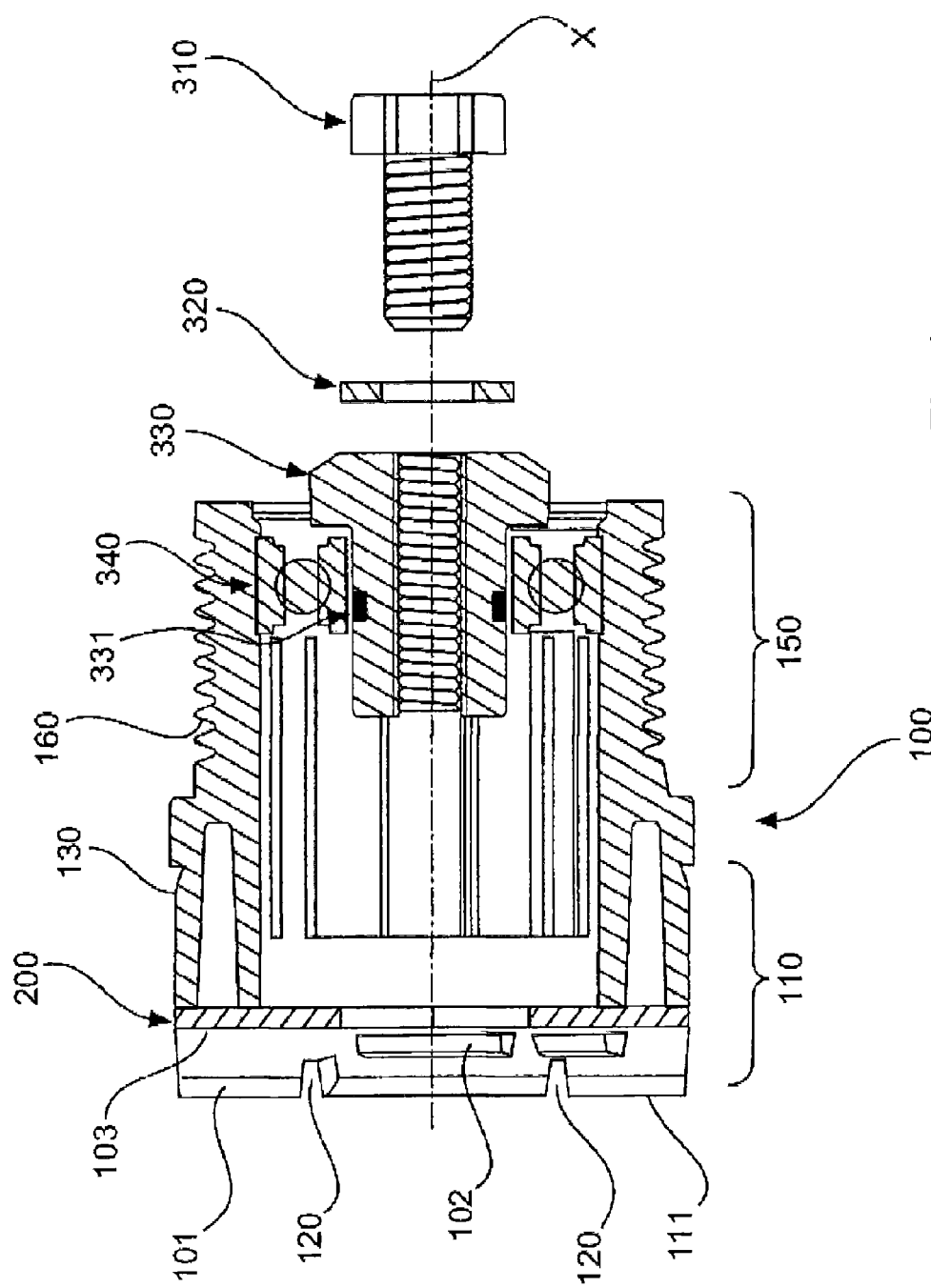

A preferred embodiment of the invention is described as an example based on the attached figures. The following is shown in:
  FIG. 1: a top view of a head element for a conveyor roller according to the invention;
  FIG. 2: a side view of the head element depicted in FIG. 1;
  FIG. 3: the detail Z from FIG. 1;
  FIG. 4: a cross-section along the section plane A-A of the head element depicted in FIG. 1;
  FIG. 5: the detail Y from FIG. 4;
  FIG. 6: a top view of a holding element for a head element according to FIG. 1;
  FIG. 7: a three-dimensional view of the holding element according to FIG. 6;
  FIG. 8: an exploded view of the head element according to FIG. 1, of the holding element according to FIG. 6 as well as additional bearing elements;
  FIG. 9: a longitudinal cross-section through the partially assembled elements according to FIG. 8; and
  FIG. 10: a longitudinal sectional view of a conveyor roller according to the invention.

The head element 100 represented in FIGS. 1 to 5 has an insertion section 110 for insertion into a hollow end 330 of a roller body 300 (not pictured). The head element 100 preferably comprises or consists of plastic. The outer cylindrical circumference of insertion section 110 of head element 100 is preferably designed as the same or slightly larger than the inner circumference of the hollow end of the roller body, so that a frictional connection arises when insertion section 110 is inserted into the hollow end of roller body.

The head element 100 has an inner cavity 170, which is designed to receive the bearing elements 300 depicted in FIGS. 8 and 9 for the rotatable mounting of head element 100. The bearing elements 300 comprise a roller bearing 340 for the mounting of a bearing pin. For example, the bearing pin is formed by a sleeve provided with an inner thread having an O-ring 331, which is mounted on the inner ring of the roller bearing 340, and a screw 310 that can be screwed into this inner thread. A supporting disk 320 can be arranged between the sleeve 330 and the screw 310. The conveyor roller can be rotatably mounted to a cage via head element 100 via this roller bearing mount 300. Ribs 105 (only partially provided with reference signs) are arranged at an axial section of the inner circumference of the inner cavity 170.

The conveyor roller can also fundamentally be mounted in another manner than in a cage with the sleeve and the screw 310 inserted therein. Thus, for example, an embodiment in which a threadless bearing pin is used for attachment instead can also be advantageous and included in the scope of protection. This bearing pin can for example be attached to the conveyor roller so that it shifts particularly in the longitudinal direction of the roller and is outwardly pre-stressed by means of a spring, in order to effect a simple and fast assembly of the conveyor roller. In a corresponding manner, another constructive embodiment can be provided on the other side of the conveyor roller, in particular a bearing pin with a non-cylindrical circumferential surface, for example a square or hexagon, for a torque-resistant mounting of the conveyor roller into a correspondingly non-cylindrical opening in the cage.

The insertion section 110 has a cylindrical cross-section in a plane that is orthogonal to the roller axis X, as well as slots 120, which extend along the circumference thereof. The slots 120 are uniformly distributed along the circumference of the insertion section 110 and extend parallel to the roller axis X. The slots 120 taper from one end of the insertion section 110 in the direction of the transmission section 150 and end while still located within the insertion section 110. The slots 120 taper from the end 111 of the insertion section 110 to the transmission section 150 and end in the insertion section 110. The ends 121 of the slots 120 serve as a stopper for a holding element, which is not pictured in greater detail with reference to FIGS. 6 and 7.

The head element 100 has an outer wall reinforcement in the form of a projection 103 on the outer circumference thereof in the region of the insertion section 110.

Insertion section 110 tapers at its end 130 that is oriented towards transmission section 150. The insertion section 110 is inserted up to this end 130 into the hollow end of a roller body. The end of the roller body is then preferably flanged in the region 130 of the head element 100 in order to improve the torsionally rigid connection between the insertion section 110 and the roller body.

A first annular bead 101 is located between the slots 120 at the end 111 of the insertion section 110 as well as a further annular bead 102 placed in an axial direction at a distance from the transmission section 150 at a distance 104, which further annular bead is at a smaller radial distance from the roller axis X than the first annular bead 101. The annular bead 102 has notches 122, which are oriented towards the slots 120 in the radial orientation thereof, which is especially advantageous when the axial extension of the slots 120 from the end 111 of the insertion section 110 to the end of the slots 121 is longer than the distance 104 between the first annular bead 101 and the second annular bead 102. An annular surface 106 extending obliquely in a radial direction outward that is located between the first annular bead 101 and the second annular bead 102 has depressions 107 (only partially provided with reference signs). This configuration of the head element 100, in particular of the insertion section 110, serves to increase the stability of the head element 100 and to receive forces transmitted to the head element via the holding element.

A second bearing can be placed in the inwardly lying end region of the head element, which is necessary in particular if the bearing pin is affixed to the cage in a manner that is not resistant to tipping, such as in the case of a pin that shifts axially and is supplied with a spring for easier and faster assembly of the conveyor roller, such as the aforementioned hexagonal pin. In this case, a radial rolling contact bearing in the head element can be axially secured through positive engagement to the outer ring of the bearing through notches 122 by means of a snap connection and can create a second radial support of the bearing pin on the head element of the conveyor roller in order to support this roller in a tip-resistant manner.

In addition, the head element 100 has a transmission section 150 for transmitting the rotation of the roller body to one or more other rollers. Transmission section 150 additionally has a multiple-V profile 160 at its outer circumference, which can receive one or more poly-V-belts (not pictured).

A holding element for the head element 100 depicted in FIGS. 1 to 5 is depicted in FIGS. 6 and 7. The holding element 200 is disk-shaped, having an axial extension 250 in the direction of the roller axis X, which is essentially less than the extension of the holding element 200 in a plane that is orthogonal to the roller axis X. The holding element 200 is star-shaped, having a plurality of circumferential peaks 210 and an inner, circular recess 240. A plurality of flattened segments 220 are formed between the circumferential peaks 210 along the circumference of the holding element 200; said flattened segments are connected to the circumferential peaks 210 via concave curvatures 230. Only one flattened segment 220 and one concave rounding 230 are provided with reference signs in each of FIGS. 7 and 8, as is only one circumferential peak 210 in FIG. 8.

As can be seen in FIGS. 8 and 9, the holding element 200 is inserted into the insertion section 110 of the head element 100 in such a way that the circumferential peaks 210 extend outward through the slots 120 to the outside along the outer circumference of the insertion section 110. In FIG. 9, the holding element 200 is depicted as being inserted up to the ends of the slots 120, however none of the circumferential peaks that extend outward along the outer circumference of the insertion section 110 are depicted in FIG. 9.

The distance between the point 202 that lies on the circumference of the holding element 200 and the roller axis X in a specific radial direction (here, in a vertical direction oriented upward) is greater than the distance between the roller axis X and a point on the inner circumference of the hollow end of the roller body. In this way, when the insertion section 110 of the head element 100 with the holding element 200 is inserted into the hollow end of the roller body, an adjustment must be made between the circumferential peaks 210 of the holding element 200 and the inner surface of the roller body. Through this adjustment, a relative movement between the head element 100 and the roller body is prevented even in the case of high torques.

The holding element 200 is preferably formed out of metal, and namely from a metal that is harder than the material of the roller body, in particular the material on the inner surface of the hollow end of the roller body. In this way, the circumferential peaks 210 of the holding element 200 dig into the inner surface of the roller body when the insertion section 110 of the head element 100 is inserted or introduced into the hollow end of the roller body so that an especially reliable torsionally rigid connection is created between the head element 100 and the roller body.

Figure 10:
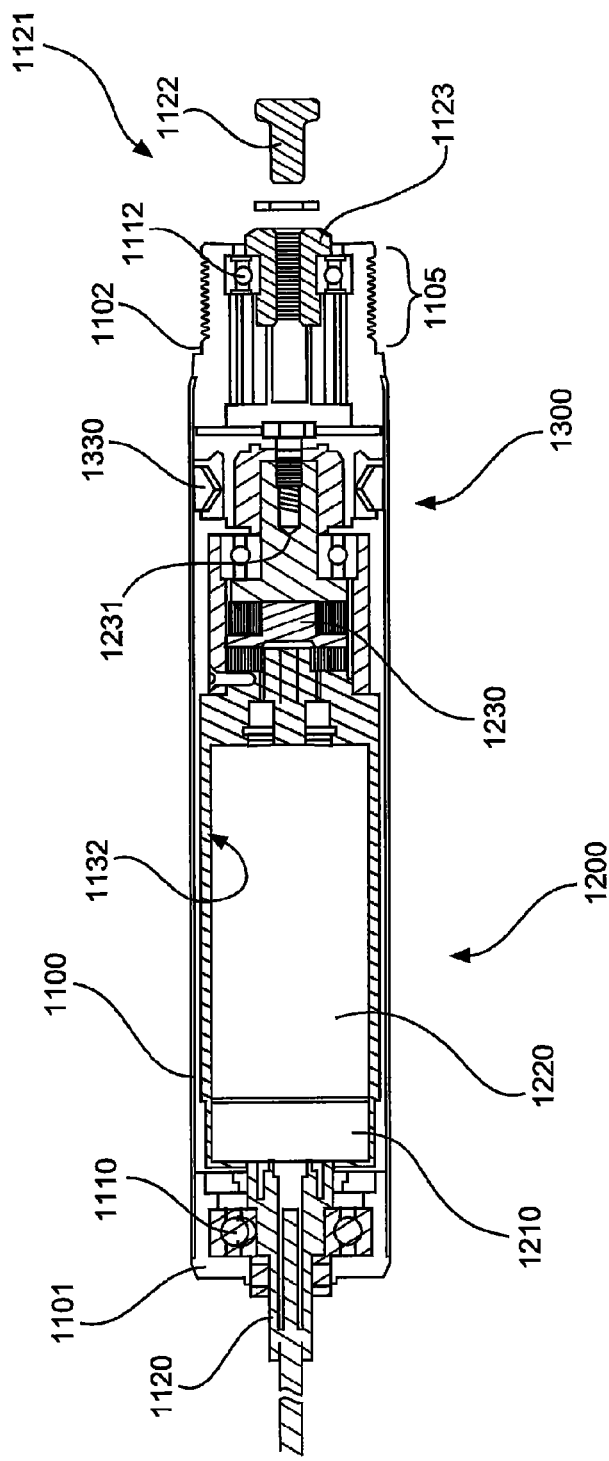

FIG. 10 shows the basic construction of a conveyor roller according to the invention, which here is designed as a motor-driven conveyor roller. In a roller body 1100 at a first end, an end cap 1101 permanently connected to the roller body is installed, inside of which a roller bearing 1110 is arranged. The roller bearing 1110 serves for the rotatable mounting of a bearing pin 1120. The bearing pin 1120 is provided with an outer thread at an outwardly pointing end, onto which a nut is screwed and by means of which the bearing pin can be attached in a torque-resistant manner in an opening of a cage, in that the cage is clamped between the nut and a sleeve fastened on the thread inwardly from the nut.

The roller body 1100 has an inner peripheral area 1132, which radially borders an interior of the roller body.

The bearing pin 1120 is designed as hollow, and supply and control lines are run through the inner hole of bearing pin 1120 to a drive unit 1200. The drive unit 1200 is arranged inside roller body 1100 and is attached to bearing pin 1120 in a torque-resistant manner. The drive unit 1200 has control electronics 1210 at its end that is oriented towards bearing pin 1120 for the control of an electrical drive motor 1220, which is preferably designed as a brushless three-phase direct current motor with internal runners. The drive motor 1220 is arranged between control electronics 1210 and a planetary gear 1230 of drive unit 1200, which is arranged at the end of the drive unit that is oriented away from bearing pin 1120.

The planetary gear 1230 has a drive shaft 1231 designed with a hexagonal cross-section, which is connected by means of a form fit to a coupling unit 1300 in a torque-resistant manner. The coupling unit 1300 is fastened with pressure ring 1330 to the inner wall of the roller body by means of a frictional connection and transmits the torque from the drive unit and the rotation of the drive shaft to the roller body. As a consequence thereof, the roller body rotates with a drive torque relative to the bearing pin and drive unit 1200.

At the end of the roller body that lies opposite the bearing pin 1120, an end piece 1102 is attached to the roller body in a torque-resistant manner. This end piece has a plurality of W-shaped circumferential grooves 1105, by means of which the rotation and the torque of the conveyor roller can be transmitted to adjacent idle rollers. Within the end piece 1102, there is additionally a roller bearing 1112 arranged for the mounting of a bearing pin 1121 at the end. The bearing pin 1121 is formed by a sleeve 1123 provided with an inner thread which is mounted to the inner ring of roller bearing 1112, and a screw 1122 that can be screwed into this inner thread in order to be able to additionally affix the conveyor to a cage at this end.

The invention claimed is:

1. A conveyor roller for conveyor systems for the purpose of conveying containers, pallets and the like, comprising
   a roller body having a roller axis, the outer peripheral area of which represents a bearing surface for material to be conveyed, and
   a head element having an insertion section and being inserted with the insertion section into a hollow end of the roller body,
wherein a holding element is inserted onto the insertion section of the head element, said holding element having at least one point on the outer circumference thereof, the distance of which in a radial direction from the roller axis (X) is greater than a distance between the roller axis (X) and a point on an inner circumference of the hollow end of the roller body in the same radial direction,
   wherein slots are distributed around the circumference of the insertion section, and the holding element has circumferential peaks, which extend radially through the slots towards the outside.

2. The conveyor roller according to claim 1, further comprising a drive unit, which is designed and arranged to transmit a torque to the roller body.

3. The conveyor roller according to claim 1, wherein the insertion section and the end of the roller body each have a cylindrical cross-section.

4. The conveyor roller according to claim 1, wherein the head element has a transmission section for transmitting a torque to a transmission element.

5. The conveyor roller according to claim 4, wherein the circumferential profile on the outer circumference of the transmission section has a double-W-shape in order to receive two poly-V-belts.

6. The conveyor roller according to claim 4, wherein the outer circumference of the transmission section has a multiple-V circumferential profile in order to receive one or a plurality of poly-V-belts.

7. The conveyor roller according to claim 1, wherein the holding element is disk-shaped.

8. The conveyor roller according to claim 1, wherein the holding element is star-shaped.

9. The conveyor roller according to claim 1, wherein the holding element comprises or consists of a first material, and that the roller body comprises or consists of a second material, and that the first material is harder than the second material, wherein the head element preferably comprises or consists of a third material, and the first material is harder than the third material.

10. The conveyor roller according to claim 1, wherein the slots extend from one end of the insertion section in the direction of the transmission section and end in the insertion section.

11. The conveyor roller according to claim 1, wherein the slots taper towards the transmission section.

12. The conveyor roller according to claim 1, wherein the insertion section tapers at the end (130) thereof that is oriented towards the transmission section.

13. The conveyor roller according to claim 12, wherein the end of the roller body has a flange in the region of the tapered end of the insertion section.

14. A method for manufacturing a conveyor roller for conveyor systems for the purpose of conveying containers, pallets and the like, in particular a conveyor roller comprising the following steps:
   Provision of a roller body having a roller axis, the outer peripheral area of which represents a bearing surface for material to be conveyed,
   Provision of a head element having an insertion section for insertion into the hollow end of the roller body,
   Insertion of a holding element into the insertion section, wherein the holding element has at least one point on the outer circumference thereof, the distance of which in a radial direction from the roller axis (X) is greater than a distance between the roller axis (X) and a point on an inner circumference of the hollow end of the roller body in the same radial direction
   Insertion of the insertion section of the head element with the holding element into the hollow end of the roller body,
wherein slots are distributed around the circumference of the insertion section, and the holding element has circumferential peaks, which extend radially through the slots towards the outside.

* * * * *